United States Patent
Breindel et al.

(10) Patent No.: US 6,465,605 B2
(45) Date of Patent: Oct. 15, 2002

(54) BRANCHED POLYMERIC SURFACTANT REACTION PRODUCTS, METHODS FOR THEIR PREPARATION, AND USES THEREFOR

(75) Inventors: Kenneth Breindel, Lansdale; Ronald W. Broadbent, Horsham; Michael S. Wiggins, Lansdale; Marcie Natale, Plymouth Meeting, all of PA (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/783,855

(22) Filed: Feb. 15, 2001

(65) Prior Publication Data
US 2001/0027227 A1 Oct. 4, 2001

Related U.S. Application Data
(60) Provisional application No. 60/182,811, filed on Feb. 16, 2000, provisional application No. 60/182,967, filed on Feb. 16, 2000, and provisional application No. 60/197,243, filed on Apr. 14, 2000.

(51) Int. Cl.$^7$ .................. C08G 59/00; C08G 65/00; C08K 5/00; C08K 5/06
(52) U.S. Cl. .................. 528/403; 528/466; 524/366; 524/376; 524/377; 568/618; 568/619; 568/622; 568/623; 568/624; 568/625
(58) Field of Search ................ 528/403, 406; 524/366, 376, 377; 568/608, 619, 622, 623, 624, 685

(56) References Cited
U.S. PATENT DOCUMENTS

| | | | |
|---|---|---|---|
| 5,827,453 A | | 10/1998 | Gross et al. |
| 5,877,245 A | * | 3/1999 | Wiggins et al. ............. 524/366 |
| 5,895,605 A | | 4/1999 | Gross et al. |

* cited by examiner

Primary Examiner—Duc Truong
(74) Attorney, Agent, or Firm—John E. Drach; Henry E. Millson, Jr.

(57) ABSTRACT

Polymeric compounds useful as low foaming surfactants and defoaming and stabilizing agents for aqueous-and nonaqueous-based compositions, and to processes for the preparation of the polymeric compounds, wherein the polymeric compounds are the reaction products of reactants comprising A) at least one linking compound of formula I $$R^1(X)_3 \qquad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and B) compounds of formula 11

$$R^2(OA)_nX \qquad (II)$$

wherein $R^2$ is an organic group containing from 4 to 36 carbon atoms, n is a number of from 0 to 200, X is —OH, —NHR', or —SH and each OA group is independently an ethyleneoxy, 1,2-propyleneoxy, or 1,2-butyleneoxy group.

40 Claims, No Drawings

BRANCHED POLYMERIC SURFACTANT REACTION PRODUCTS, METHODS FOR THEIR PREPARATION, AND USES THEREFOR

CROSS-REFERENCE TO RELATED APPLICATIONS:

This application claims the benefit of copending provisional application Ser. Nos. 60/182,811, filed on Feb. 16, 2000; Ser. No. 60/182,967 filed on Feb. 16, 2000 and Ser. No. 60/197,243 filed on Apr. 14, 2000, the entire contents each of which are incorporated herein by reference.

FIELD OF THE INVENTION

This invention relates to polymeric compounds useful as low foaming surfactants and as defoaming and stabilizing agents for both aqueous-based and nonaqueous-based compositions, especially hydrophilic emulsion polymer latexes.

BACKGROUND OF THE INVENTION

There is an increasing need for surfactants that are low foaming for use in compositions where high levels of foam are disadvantageous. In addition, some low foaming surfactants have limited mobility properties which can limit their use where high mobility is desired or required.

Also, defoaming agents for aqueous-based systems are often required to reduce the foam generated by high foaming surfactants and other components of such aqueous-based systems. Such aqueous-based systems include latex paints, printing inks, protective coatings for paper and metal, and the like.

However, some defoaming agents and compositions containing them exhibit limited hydrolytic stability. Moreover, for some applications it is desirable to use defoaming agents having both hydrophilic and hydrophobic properties. Moreover, in the preparation and use of water-based coatings, a recurrent problem is the presence of very small air bubbles (microform) which are not broken by defoamers which are currently used as a component of these coatings.

SUMMARY OF THE INVENTION

The present invention relates to low foaming surfactants which are water-soluble or water-dispersible, and possess good hydrolytic stability and high mobility. They are useful as both defoaming and stabilizing agents for aqueous-based compositions. The invention also relates to aqueous or organic solvent dispersions or solutions containing the surfactants, to methods for the preparation of the surfactants, and to aqueous-based compositions containing these surfactants. The present low foaming surfactants are also useful as microfoam control agents in water-based coating compositions, wherein microfoam problems are eliminated or at least significantly reduced.

The surfactants of the invention include branched compounds or mixtures of compounds which are the base-catalyzed, reaction products of components comprising
A) at least one linking compound of formula I $$R^1(X)_3 \qquad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms;

B) at least one compound of formula II $$R^2(OA)_nX \qquad (II)$$

wherein $R^2$ is an organic group containing from 1 to 36 carbon atoms, n is a number of from 0 to 200, preferably 1 to 100, more preferably 2 to 20, X is —OH, —NHR' wherein R' is hydrogen or a $C_{1-C4}$ alkyl group, or —SH, and each OA group is independently an ethyleneoxy, 1,2-propyleneoxy, or 1,2-butyleneoxy group, provided that when X is an amine group, n is at least 1; and, optionally,
C) from about 0.001 to about 50 mole %, preferably from 10 to 30 mole %, based on the total moles of components A), B) and C), of at least one of the following compounds,
  a) a polyol containing at least 3 hydroxyl groups, one or more of which are optionally alkoxylated, and
  b) a polyamine containing at least two amino groups, e.g. 2, 3, 4, 5 or 6 amino groups or more, and which can optionally contain alkyleneoxy groups, e.g., a polyether backbone based on ethylene oxide (EO), propylene oxide (PO), or both ethylene oxide and propylene oxide (EO/PO); wherein the ratio of moles of component A) to the sum of the —OH, —SH, and —NHR' equivalents in components B) plus C) is from about 0.6:1 to about 5.0:1; more preferably from 0.8:1 to 1.4:1; provided that when component C) is not present, component B) is a mixture of at least two compounds of formula II wherein the $R^2$ group in the first compound (B) a)) is an aliphatic group, preferably an alkyl group, containing from 1 to 8 carbon atoms, or a phenol or styrenated phenol group, and the $R^2$ group in the second compound (B) b)) is an aliphatic group, preferably an alkyl group, containing from 9 to 36 carbon atoms, and said second compound B) b) is present in from about 0.001 to about 50 mole %, preferably from 10 to 30 mole %, based on the moles of the first compound B) a), and when component C) is present R in component B) contains from 4 to 36 carbon atoms.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about".

In the above reaction products, the compounds of formula II in component B) are aliphatic (optionally alkoxylated) alcohols or phenol or styrenated phenol which are also optionally alkoxylated, and/or the corresponding sulfhydryl and amine compounds.

The $R^2$ group can be a substituted or unsubstituted, saturated or unsaturated hydrocarbon group having from 1 to 36 carbon atoms. Examples of such hydrocarbon groups include linear or branched alkyl groups having from 1 to 22 carbon atoms, preferably from 4 to 22 carbon atoms, linear or branched alkenyl and alkynyl groups having from 2 to 22 carbon atoms, preferably from 4 to 22 carbon atoms, aryl groups having from 6 to 22 carbon atoms, and arenyl groups having from 7 to 22 carbon atoms.

The R group can also be a saturated carbocyclic group, an unsaturated carbocyclic group having one or more multiple bonds, a saturated heterocyclic group, or an unsaturated heterocyclic group having one or more multiple bonds. Any of the above $R^2$ groups can be substituted groups, i.e. the groups can contain single or multiple substitutions such as a halogen substitution, for example Cl, Fl, I and Br; a sulfur functionality such as mercaptan or thio group; a nitrogen functionality such as an amine or amide functionality; a silicon functionality, e.g. a siloxane group; or any combination thereof.

When component C) is present, the $R^2$ group in formula II is preferably a straight or branched chain alkyl group containing from 4 to 36 carbon atoms, preferably from 8 to 12 carbon atoms.

When X in formula II is an amine or sulfhydryl group, the resulting compounds can be readily prepared from the corresponding alcohols wherein the terminal hydroxy group is replaced by an —SH group or by an amine nitrogen. For example, a compound of formula II where X is —OH can be subjected to a catalyzed ammoniation (with ammonia, or a lower alkylamine) for replacement of the hydroxyl, or to a capping of the hydroxyl with epichlorohydrin followed by ammoniation (with ammonia, or a lower alkylamine) of the resulting glycidal group. Many of these compounds are available under the tradename JEFFAMINE™, from Texaco Chemical Company, Houston, Tex. as the JEFFAMINE™ series.

The linking compound of formula I is preferably epichlorohydrin although other epihalohydrins can be used. Also, trihaloalkanes can be used, such as 1,2,3trichloropropane, 1,2,44richlorobutane, 1,3,6-trichlorohexane, and the like. Instead of chlorine in the epihalohydrins and the trihaloalkanes, the corresponding bromine and iodine compounds can also be used, including compounds containing two or even all three of the above halogens.

The above reaction products are branched polymers in which analysis has shown the absence of both epoxy groups and halogen atoms from the linking compounds of formula I.

It has been discovered that when component C) is not present, the reaction products consisting only of component A) and component B) a) have excellent mobility properties, but are more highly foaming than is desired for some applications. Conversely, it has also been discovered that the reaction products consisting only component A) and component B) b) are very low foaming surfactants and can also be used as defoaming agents for aqueous compositions containing high foaming surfactants, but have limited mobility.

In the compounds of formula II, the OA groups when present are preferably all ethyleneoxy groups. However, as stated above, each OA group can be independently an ethyleneoxy, 1,2-propyleneoxy, or 1,2-butyleneoxy group, i.e. any one or more such groups can be present, and can be present in any order, as well as be present in blocks, e.g. compounds of the formula Ill.

$$R^2(OE)_n(OP)_m(OB)_pX \qquad (III)$$

wherein $R^2$ and X have the meanings given above, n is a number of from 0 to 50, e.g. from 1 to 50, m is a number of from 0 to 50, e.g. from 1 to 50, and p is a number of from 0 to 50, e.g. from 1 to 50.

The polyols of component C) a) include compounds of formula IV $$R^3((OA)_xOH)_y \qquad (IV)$$

where $R^3$ is a straight or branched chain $C_{3-C36}$ alkyl group, each OA group is independently an ethyleneoxy, 1,2-propyleneoxy, or 1,2-butyleneoxy group, each x in each y group is independently a number of from 0 to 200, and y is a number of at least 3, e.g. from 3 to 1000. In formula IV, x is preferably a number of from 1 to 200, more preferably from 5 to 100, and the OA groups are preferably all OE groups. Examples of compounds of formula IV include glycerin alkoxylates, trimethyol propane alkoxylates, pentaerythritol alkoxylates, and polyvinyl alcohols, especially those of low viscosity, i.e. having a molecular weight of from 25,000 to 35,000.

The polyamines of component C) b) are preferably those of formula V.

$$H_2N(AO)_nA\,NH_2 \qquad (V)$$

in which each A group is independently an ethylene or 1,2-propylene group, preferably ethylene groups, and n is a number of from 1 to 200, preferably 1 to 5. Compounds of formula V are commercially available from Texaco Chemical Company, Houston, Tex. as JEFFAMINE™ D and JEFFAMINE™ ED series.

In addition, polyamines of the formula VI are also preferred

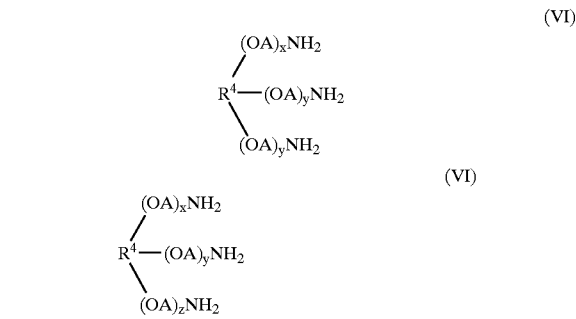

in which $R^4$ is a straight or branched chain $C_{3-C35}$ alkyl group, each OA group is independently an ethyleneoxy or 1,2-propyleneoxy group, and x, y, and z are each independently a number of from 1 to 200, preferably from 5 to 100. Compounds of formula VI are available from Texaco Chemical Company as the JEFFAMINE™ T series. The $R^4$ group is preferably trimethylol propane or glycerin.

It is critical for the compounds of the invention that the ratio of moles of component A) to the sum of the OH, SH, and NHR' equivalents in compounds B) plus C) be in the range of 0.6:1 to 5.0:1 since a ratio of greater than 5.0:1 will result in the formation of an aqueous gel rather than an aqueous solution which is required for use as a defoaming agent for aqueous compositions such as latex paints. Conversely, a ratio of less than 0.6:1 will result in less branching and accordingly less effective defoaming and stabilizing activity per unit weight of active compound. The compounds of the invention are designed to be branched compounds.

The degree of hydrophilic and hydrophobic properties of the products of the invention can be readily controlled by controlling the type and number of alkyleneoxy groups in components B) and C). For example, the greater the number of ethyleneoxy groups present, the greater the water solubility, while the presence of 1,2-propyleneoxy groups and/or 1,2-butyleneoxy groups for example, will decrease water solubility.

The molar ratios of components used to prepare the present compounds can be selected from the following ranges: Component A):component B):component C) =(0.5 to 1):1:(0 to 1), provided that the ratio of moles of A) to the sum of the OH, SH, and NHR' equivalents in B) plus C) must be in the range of from 0.6:1 to 5.0:1.

The compounds of the invention can be prepared in solutions of organic solvents if desired. These solutions typically contain from 15 to 40% by weight of solids, preferably from 20 to 40% by weight of solids. Suitable solvents include liquid polyols, liquid ethoxylated and/or propoxylated $C_{1-8}$ alcohols, or liquid ethoxylated and/or propoxylated $C_{1-8}$ carboxylic acids. A liquid polyol is any compound having two or more —OH groups which is a liquid at room temperature, examples of which include but are not limited to ethylene glycol, 1,2-propylene glycol, 1,3-propylene glycol, and 1,2-butylene glycol. A liquid ethoxylated and/or propoxylated $C_1$ alcohol is any aliphatic alcohol ethoxylated and/or propoxylated to any degree of ethoxylation of propoxylation and which is a liquid. Compounds in which the —OH group of the liquid ethoxylated and/or propoxylated $C_{1-8}$ alcohol is etherified with a $C_{1-4}$ alkyl group are also included in this group. A liquid ethoxylated and/or propoxylated $C_{1-8}$ carboxylic acid is any aliphatic carboxylic acid ethoxylated and/or propoxylated to any degree of ethoxylation and/or propoxylation provided the compound is a liquid at room temperature.

Water can also optionally be present in the above solutions.

Preferred solvents include butoxy triglycol (triethylene glycol monobutyl ether), butyl carbitol (diethylene glycol monobutyl ether), or 1,2-propylene glycol. Also preferred are combinations of butoxy triglycol, butyl carbitol, and 1,2-propylene glycol which total from 1% to 30% by weight of the total composition.

The process of the invention used to prepare the compounds of the invention is preferably carried out using the following steps:

I) component B) and component C) if present are reacted together, optionally in the presence of an organic solvent that will azetrope water, e.g. benzene, toluene, or xylene and in the presence of from 1 to 1.5 equivalents, based on OH, SH, and NHR' groups, of an alkali metal hydroxide, preferably aqueous concentrated sodium hydroxide, or an alkali or alkaline earth metal lower alkoxide, e.g. sodium methoxide, under reflux conditions, preferably at atmospheric pressure. The reflux temperature is of course dependent on whether or not an organic solvent is used in this step. The reaction is continued until the reaction is substantially complete. If an aqueous alkali metal hydroxide is employed in the reaction, the residual water content should be 0.2% by weight or less in the reaction mixture. The reaction mixture is then preferably cooled.

II) component A), i.e. the linking compound of formula I, is then added to the reaction mixture from step 1) and reacted at a temperature of from 60° C. to the reflux temperature of the mixture, preferably at a temperature of from 100 to 110° C.

III) the organic solvent if present is then removed from the reaction mixture resulting from step II), preferably by vacuum distillation.

The reaction product is separated from the salt formed by the reaction, e.g. by pressure filtration, vacuum filtration, centrifugation, water wash, electrodialysis, Donnan dialysis, nanofiltration, and the like.

IV) a solvent as described above can then be added to the reaction product from step ll) if desired to form a solution having a solids content of from 15 to 40% by weight, preferably from 20 to 40% by weight. Alternatively, the process can be carried out by combining steps I) and II), i.e. by mixing together components A), B) and C) if present in step I.

While the above reaction will proceed well in the presence of a nonpolar organic reaction solvent, e.g. toluene, carrying out the reaction in the absence of a reaction solvent was found to improve the yield of the reaction product, reduce the formation of by-products, minimize fire hazard, and eliminate the recovery costs of the used organic reaction solvent, as well as eliminating the cost of purchasing the organic reaction solvent for use in the process.

The compounds of the invention and the aqueous or the organic solvent based solutions containing them are useful as low foaming surfactants, and as defoamers and stabilizing agents for aqueous-based and non-aqueous based compositions, including but not limited to latexes, printing links, protective coatings for paper and metal, and the like, and particularly for use in hydrophilic emulsion polymer latexes. They are especially useful in latex compositions, e.g. hydrophilic latex paints, wherein the compounds of the invention are the above reaction products and are effective defoaming and stabilizing agents for the high foaming surfactants typically used in latex paints, such as alkyl polyglycosides.

It has also been discovered, and comprises part of the present invention, that physical mixtures of the reaction product of components A) and B)a) and the reaction product of components A) and B)b) also have a combination of low foaming properties and high mobility. These reaction products can be prepared by the same process described above, using either component B)a) or component B)b) in for component B) in step 1).

In particular, the invention also includes compositions comprising a mixture of the following components:

I) from 1 to 99 mole %, preferably from 10 to 90 mole %, and more preferably from 20 to 80 mole % of at least one reaction product of component A) and component B) a), and II) from 99 to 1 mole %, preferably from 90 to 10 mole %, and more preferably from 80 to 20 mole % of at least one reaction product of component A) and component B)b); wherein the mole ratio of component A): component B)a), and the mole ratio of component A): component B)b) is from about 0.5:1 to about 5:1, preferably from 0.8:1 to 2:1.

The above reaction products and the above physical mixtures can be added to aqueous or nonaqueous compositions in surfactant-or defoaming-effective quantities. Defoaming effective quantities will depend of course on a variety of factors, such as the nature and quantity of the foam-producing component or components of the aqueous or nonaqueous system, the foam level requirements of the system, the temperature of the system, and the like. However, a surfactant-effective or defoaming-effective quantity is usually in the range of from 0.1% to 20% by weight, based on the solids content of the aqueous system. Of course, organic solvents that are miscible with water can also be present in these aqueous-based compositions as desired or required.

There are a number of advantages for using the compounds of the invention. For example, smaller quantities of the present compounds are needed compared to conventional defoamers to achieve the desired degree of defoaming of emulsion polymer latexes. In addition, the resulting defoamed latexes have good flow, good leveling, good scrub, and good spatter resistance. Moreover, the defoamed latexes have good aging stability, i.e. the compounds of the invention are very effective stabilizing agents.

As discussed above, the branched reaction products of the invention, and also the above described mixtures of reaction products can be prepared in aqueous solution.

These aqueous solutions typically contain from 15% to 40% by weight of solids, preferably from 20% to 40% by weight of solids. In addition, these aqueous solutions can also contain from 1% to 30% by weight of a water-miscible cosolvent, which acts as a viscosity modifier. Suitable cosolvents include liquid polyols, liquid ethoxylated and/or propoxylated $C_{1-8}$ alcohols, or liquid ethoxylated and/or propoxylated Con carboxylic acids. A liquid polyol is any compound having two or more —OH groups which is a liquid at room temperature, examples of which include but are not limited to ethylene glycol, 1,2-propylene glycol, 1,3-propylene glycol, and 1,2-butylene glycol. A liquid ethoxylated and/or propoxylated Cue alcohol is any aliphatic alcohol ethoxylated and/or propoxylated to any degree of ethoxylation or propoxylation and which is a liquid. Compounds in which the -OH group of the liquid ethoxylated and/or propoxylated $C_18$ alcohol is etherified with a $C_{1-14}$ alkyl group are also included in this group. A liquid ethoxylated and/or propoxylated Con carboxylic acid is any aliphatic carboxylic acid ethoxylated and/or propoxylated to any degree of ethoxylation and/or propoxylation provided the compound is a liquid at room temperature.

Preferred viscosity modifiers include butoxy triglycol (triethylene glycol monobutyl ether), butyl carbitol (diethylene glycol monobutyl ether), or 1,2-propylene glycol. Also preferred are combinations of butyl triglycol, butyl carbitol, and 1,2-propylene glycol which total from 1% to 30% by weight of the aqueous solution.

It has also been discovered that the above reaction products and physical mixtures are effective in preventing or minimizing the presence of very small air bubbles (microfoam) in water-based coatings.

In addition, it has been discovered that an additional group of reaction products are effective in reducing or eliminating microfoam in water-based coatings. These reaction products are the branched reaction products of the reactants comprising A) at least one compound of formula I

$$R^1(X)_3 \qquad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and B) at least one compound having the formula VII

$$R^5(EO)_n(PO)_m(BO)_pX \qquad (VII)$$

wherein $R^5$ is a substituted or unsubstituted, saturated or unsaturated oxy or thio hydrocarbon group having from 1 to 22 carbon atoms or a secondary amino group having from 2 to 22 carbon atoms; n is a number of from 0 to 50, e.g. from 1 to 50; m is a number of from 0 to 50 e.g. from 1 to 50; p is a number of from 0 to 50 e.g. from 1 to 50; and X is hydrogen, or X can be a mercapto group or an amino group in place of a terminal —OH group, provided that when X is 5 mercapto or amino, the sum of n, m, and p is at least 1. Examples of hydrocarbon groups when $R^5$ is an oxy or thio hydrocarbon group include substituted or unsubstituted alkyl groups having from 1 to 22 carbon atoms, preferably from 4 to 22 carbon atoms, alkenyl and alkynyl groups having from 2 to 22 carbon atoms, preferably from 4 to 22 carbon atoms, aryl groups having from 6 to 22 carbon atoms, and arenyl groups having from 7 to 22 carbon atoms.

When the above groups are substituted groups, the groups can contain single or multiple substitutions such as a halogen substitution, for example Cl, Fl, I and Br; a sulfur functionality such as a mercaptan or thio group; a nitrogen functionality such as an amine or amide functionality; a silicon functionality, e.g. a siloxane group; or any combination thereof.

When $R^5$ is a secondary amino group, the group preferably contains from 4 to 22 carbon atoms.

Also, when X is hydrogen p is preferably a number of from 1 to 50. When $R^5$ is a secondary amino group, p is preferably a number of from 1 to 50.

The mole ratio of the linking compound (I) to (VII) is from 0.6:1 to 5:1, preferably from 0.8:1 top 2:1 and more preferably from 1.0:1 to 1.5:1. The use of an excess of linking compound (I) provides highly branched reaction products.

This invention accordingly also relates in one embodiment to water-based coating compositions containing a microfoam-inhibiting quantity of the reaction product of components A) and B) above, and to a method for reducing or eliminating microfoam in water-based coatings by adding thereto a microfoam inhibiting quantity of this reaction product, either during or after the formation of the coating composition.

The coating compositions of the invention are any and all such water-based compositions that have a problem with microfoam. Such coating compositions include hydrophilic latex paints, adhesives, barrier coatings, pharmaceutical encapsulation compositions, and other water-based coating compositions.

With respect to the compounds of formula VII of component B), the nonoxy and nonthio components of the $R^5$ hydrocarbon group can be any substituted or unsubstituted, saturated or unsaturated hydrocarbon moiety having from 1 to 22 carbon atoms. Thus, the nonthio and the nonoxy components of the $R^3$ group can be linear or branched alkyl groups, linear or branched alkenyl or alkynyl groups, saturated carbocyclic moieties, unsaturated carbocyclic moieties having one or more multiple bonds, saturated heterocyclic moieties, unsaturated heterocyclic moieties having one or more multiple bonds, substituted linear or branched alkyl groups, substituted linear or branched alkenyl or alkynyl groups, substituted saturated carbocyclic moieties, substituted unsaturated carbocyclic moieties having one or more multiple bonds, substituted saturated heterocyclic moieties, substituted unsaturated heterocyclic moieties having one or more multiple bonds, and arenyl moieties. Arenyl groups are alkyl-substituted aromatic radicals having a free valence at an alkyl carbon atom such as a benzylic group. Alkyl groups, either linear or branched, having from 4 to 12 carbon atoms are more preferred, and alkyl groups having from 8 to 10 carbon atoms are most preferred. In general, the compounds of formula VII wherein the sum of n, m, and p is at least 1, and especially at least 2 or 3 are preferred for use herein. The degree of ethoxylation is preferably from 2 to about 50 with the most preferred being from about 4 to about 12, while the degree of propoxylation and butoxylation can vary from 0 to about 50, preferably from 1 to about 10. The degree of propoxylation and or butoxylation will be determined to provide the necessary water solubility or dispersibility. The water solubility or dispersibility will ultimately be determined by such factors as the number of carbon atoms in $R^3$ and the relative amounts EO, PO and BO.

When the X group of formula VII is a mercapto group, the $R^5$ group will preferably have from about 4 to about 22 carbon atoms, n is from 0 to about 50, m is from 0 to about 50 and p is from 0 to about 50, examples of which include but are not limited to, alkoxylated dodecyl mercaptan and alkoxylated 1-hexadecanethiol.

The compounds of formula (VII) can be alkoxylated or non-alkoxylated secondary amines. When the compounds of formula II are secondary amines n is number from 0 to 50, preferably from 1 to 50, m is a number from 0 to 50 and p is a number from 0 to 50. Examples of the secondary amines useful for the purposes of the invention include, but are not limited to, alkoxylated dibutyl amine, alkoxylated dicyclohexyl amine, alkoxylated diethylethanolamine, and alkoxylated dioctylamine.

Optionally an additional component C) can be reacted with the linking agent of formula (I) and the compound of formula (VII). A glycidyl ether or amine can be added to the reaction of formula (I) and formula (VII). The amount of the glycidyl ether or glycidyl amine is from about 1 to about 20 mole percent based on the moles of the compounds of formula (VII) used in reaction. When the glycidyl ether or glycidyl amine is added, the ratio of component A) plus the glycidyl ether or glycidyl amine to component B) is preferably from about 1.2:1 to about 5:1. Examples of the glycidyl ethers include, but are not limited to, PEG 600 Diglycidyl ether, TETRONIC™ 701 Tetraglycidyl ether, Triglycidyl Di or Triethanolamine, Polyoxyethylene (POE) 200 Tallow amine diglycidyl ether, Propoxylated (POPIO) Trimethylol propane triglycidyl ether, Propoxylated (POP7) Pentaerythritol tetraglycidyl ether. Examples of glycidyl amines include, but are not limited to, Tetraglycidyl 1,6-Hexane diamine, Tetraglycidyl JEFFAMINE™ EDR-148, and Tetraglycidyl Isophorone diamine.

The above reaction products can be added to water-based coating compositions during their preparation, or as an additive following their preparation. Effective quantities will typically range from 0.05 to 5%, preferably from 0.5 to 1.5%, based on solids. The effective amount will depend on the particular water-based coating compositions and the extent of the microfoam in the coating composition.

The reaction products comprising linking agent (I) and compound (VII) can also be used with other defaming agents for the control of microfoam in water-based coating compositions. The present reaction products can be used as part of a multi-component defoamer composition comprised of a hydrophobic solid, and one or more reaction products according to the invention dispersed or dissolved in an inert, water insoluble carrier fluid. The hydrophobic solid is any solid that is insoluble in the carrier fluid and having a particle size of less than about 70 microns. Examples of the hydrophobic solid include, but are not limited to, waxes such as polyethylene wax, ethylene-bis-stearamide; inorganic powders such as silica and silica hydrophobed with silicone oil. Mixtures of various types of hydrophobic solids can also be used. The carrier fluid useful in the multi-component defoamer compositions according to the invention is any water-insoluble liquid that will disperse the hydrophobed solid, such as paraffin oil, naphthenic oils, liquid hydrocarbons, tall oil fatty acids and ethoxylated tall oil fatty acids, fatty alcohols and ethoxylated fatty alcohols, liquid polypropylene oxide, liquid polyethylene oxide, liquid poly(ethylene oxide-propylene oxide), silicon oils, organically modified silicon oils, glycols, fatty acid esters, or any combination thereof. A microfoam defoaming effective amount of such a multi-component defoamer composition will be readily determinable by one of ordinary skill in the art and will typically vary from about 0.1% by weight to about 10%, preferably from about 0.1 to about 1.0% by weight.

The invention will be illustrated but not limited by the following examples. In the examples, EO=ethylene oxide, PO=propylene oxide, and BO=butylene oxide.

EXAMPLES

Example 1

To a stainless steel 1 liter reactor is added 500 grams (1.5 OH equivalents) of isodecyl alcohol, •4 EO and 120 grams (1.5 equivalents) of 50% aqueous sodium hydroxide. With stirring, nitrogen sweep, and vacuum, the mixture is heated to 140° C. to distill off all ambient water and water from alkoxide formation. When all water is distilled off, the mixture is cooled to 60° C. and the vacuum broken with nitrogen. 1.5 moles of epichlorohydrin are slowly added while keeping the exotherm temperature below 80° C. The reaction is carried out at 60–80° C. until alkali titration is near zero. 0.25 Amine equivalents (0.125 moles) of JEFFAMINE™ ED-600 *(75 grams) is then added and reacted until epoxy titration equals zero. If the reaction stops before epoxy titration equals zero, a Lewis acid is added, such as boron trifluoride etherate, in catalytic quantities until the epoxide content equals zero. The salt formed in the reaction is then filtered out from the reaction product.

*JEFFAMINE™ ED600 has the formula

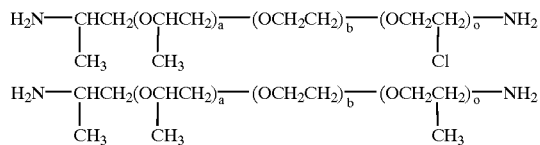

where b is approximately 8.5, a+c=2.5, and the molecular weight is about 600.

Example 2

One mole of decyl alcohol •4EO and 0.1 mole (0.3 OH equivalents) of trimethyl propane •200 EO is reacted with 1.2 moles of epichlorohydrin in the presence of 1.5 equivalents of 50% NaOH at reflux temperature until all ambient water and water of reaction is removed. The reaction is continued until epoxide titration shows no more oxirane groups are present in the reaction mixture. The salt formed in the reaction is removed from the reaction product.

Example 3

One mole of dodecyl alcohol •4EO is reacted with one mole of epichlorohydrin in the presence of 0.1 grams of $BF_a$ etherate at a temperature of 80° C. to give a reaction mixture containing a chlorohydrin intermediate. Then 0.1 moles (0.4 equivalents) of pentaerythritol •400 EO and 1.2 moles of 50% sodium hydroxide are added to the above reaction mixture and the reaction carried out at reflux temperature until no water and oxirane groups are present in the reaction mixture. The salt formed in the reaction is filtered off from the reaction product.

Example 4

285 g. (1.4 moles) of butoxytriglycol, 153 g. (0.46 moles) of isodecanol •4EO, and 63 g (0.3 moles) of PEG200 were placed in an SS reactor. 237 g (3.0 moles) of 50% aqueous NaOH was added. A stirrer, condenser, receiver, thermometer, and nitrogen inlet tube were placed in the reactor head. Vacuum (27 in. Hg) and heat (110° C.) were applied to remove water and form an alkoxide reaction product. When no more water could be removed, the reaction mixture was cooled and the vacuum released with nitrogen gas. Then 219 g. (2.4 moles) of epichlorohydrin were added slowly with cooling in an icebath to control the exothermic reaction. When all the epichlorohydrin was added and the exothermic reaction stopped, the temperature was slowly raised to 140° C. and maintained at this temperature until no epoxide remained in the reaction mixture. The reaction mixture was cooled, neutralized, redried, and the salt filtered off leaving a clear amber liquid product.

Example 5

The process of Example 4 is repeated except that the following reaction components are used:
- 205 g (1.1 moles) of diethylene glycol monohexyl ether
- 222 g. (1.1 moles) of butoxytriglycol
- 126.8 g (0.3 moles) of decyl alcohol •6EO
- 77.5 g. (0.4 moles) of PEG200
- 241 g (3 moles) of 50% aq. NaOH
- 224 g (2.4 moles) of epichlorohydrin

Example 6

The process of Example 4 is repeated except that the following reaction components are used:
- 285 g (1.4 moles) of butoxytriglycol
- 153 g (0.46 moles) of isodecanol •4EO
- 237 g (3.0 moles) of 50% aq. NaOH
- 219 g (2.4 moles) of epichlorohydrin

Example 7

The process of Example 5 is repeated except that the following reaction components are used:
- 222 g (1.1 moles) of butoxytriglycol
- 126.8 g (0.3 moles) of decyl alcohol •6EO
- 241 g (3 moles) of 50% aq. NaOH
- 244 g (2.4 moles) of ephichlorohydrin

Example 8

The process of Example 4 is repeated except that the following reaction components are used:
- 400 g. (2.1 moles) of diethylene glycol monohexyl ether
- 21 g. (0.05 moles) of decyl alcohol •6EO
- 70 g. (0.35 moles) of PEG 200
- 270 g. of 50% aqueous NaOH
- 250 g. (2.7 moles) of epichlorohydrin

Example 9

The process of Example 4 is repeated except that the following reaction components are used:
- 1,493 g. (3.5 moles) of butyl alcohol •8EO
- 520 g. (1.6 moles) of isodecanol •4EO
- 52 g. (0.26 moles) of PEG 200
- 174 g. (2.2 moles) of 50% aqueous NaOH
- 555 g. (6 moles) of epichlorohydrin

Example 10

The process of Example 4 is repeated except that the following reaction components are used:
- 500 g. (2.4 moles) of butoxytriglycol
- 21 g. (0.05 moles) of decyl alcohol •6EO
- 266 g. (3.3 moles) of 50% aqueous NaOH
- 212 g. (2.3 moles) of epichlorohydrin

Example 11

The process of Example 4 is repeated except that the following reaction components are used:
- 400 g. (2.1 moles) of diethylene glycol monohexyl ether
- 362.5 g. (1 mole) of dodecanol •4EO
- 185 g. (2.3 moles) of 50% aqueous NaOH
- 197 g. (2.1 moles) of epichlorohydrin

Example 12

The process of Example 4 was repeated except that the following reaction components are used:
- 205 g. (1.1 moles) of diethylene glycol monohexyl ether
- 185.3 g. (0.5 moles) of dodecylamine
- 77.5 g (0.4 moles) of PEG 200
- 241 g. (3 moles) of 50% aqueous NaOH
- 224 g. (2.4 moles) of epichlorohydrin

Example 13

The process of Example 4 was repeated except that the following reaction components are used:
- 205 g. (1.1 moles) of diethylene glycol monohexyl ether
- 185.3 g. (0.5 moles) of dodecylamine
- 24.03 g. (0.4 moles) of ethylenediamine
- 241 g. (3 moles) of 50% ag. NaOH
- 224 g. (2.4 moles) of epichlorohydrin

Example 14

This example illustrates a process for preparing a reaction product used in the practice of the invention in which the process is carried out in the absence of an organic solvent.

150.1 Gms (0.45 hydroxyl equivalent) of decyl alcohol •4EO was added to a reaction kettle. The ethoxylated alcohol was heated to 140° C. under 28 inches Hg vacuum with a nitrogen sweep. 50% Aqueous Na OH was added dropwise, and water which distilled off was collected. When the mixture level in the kettle was between 1 and 2%, the mixture was cooled to 120° C. and 46.2 g (0.51 eq.) of epichlorohydrin was slowly added. The reaction was carried out at 120° C. until the epoxide value was zero. The reaction product was separated from the salt of formation by the use of pressure filtration.

Example 15

150.1 g (0.45 hydroxyl equivalents) of decyl alcohol •4EO was mixed with 385 g. of toluene. 54G of 50% aqueous Na OH (0.675 eg) was added and water (including water of reaction) was removed by distillation. When the moisture level was below 0.8%, 46.2g (0.51 eq.) of epichlorohydrin was added slowly. The resulting mixture was allowed to react for 24 hours at 100–110° C. the reaction mixture was filtered to remove NaCl formed in the reaction and vacuum stripped to remove the toluene solvent. The residue was an amber, easily pourable liquid product, which was dispersible in water.

One gram of this product in 50 grams of DI water with 1 gram of decyl alcohol •4EO when shaken showed very low foam. One gram of decyl alcohol •4EO alone in 50 grams of DI water when shaken exhibited a very high level of foam.

Example 16

51:8 G (0.32 hydroxyl equivalent) of n-butanol •2EO (butyl Carbitol™), 120 g. of toluene, and 25 g (0.32 eq.) of 50% NaOH were mixed and water removed by distillation according to the process of Example 15. Then 22.2g (0.24 eq.) of epichlorohydrin were added slowly and allowed to react and the reaction product isolated as in Example 15.

The reaction product was a pourable amber liquid which was insoluble and not readily dispersible in water.

What is claimed is:

1. A branched compound or mixture of compounds which are the reaction products of components comprising A) at least one linking compound of formula I $$R^1(X)_3 \qquad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms;

B) at least one compound of formula II $$R^2(OA)_nX \qquad (II)$$

wherein $R^2$ is an organic group containing from 1 to 36 carbon atoms, n is a number of from 0 to 200, X is —OH, —NHR' wherein R' is hydrogen or a $C_1$–$C_4$ alkyl group, or —SH and each OA group is independently an ethyleneoxy, 1,2-propyleneoxy, or 1,2-butyleneoxy group, provided that when X is an amine group, n is at least 1; and, optionally C) from about 0.001 to about 50 mole %, based on total moles of A), B), and C), of at least one of the following compounds,
   a) a polyol containing at least 3 hydroxyl groups, one or more of which are optionally alkoxylated, and
   b) a polyamine containing at least two amino groups, and which can optionally contain alkyleneoxy groups;

wherein the ratio of moles of component A) to the sum of the OH, —SH, and —NHR' equivalents in components B) plus C) if present is from about 0.6:1 to about 5.0:1; provided that when component C) is not present, component B) is a mixture of at least two compounds of formula II wherein the $R^2$ group in the first compound (B) a)) is an aliphatic group containing from 1 to 8 carbon atoms, or a phenol or styrenated phenol group, and the $R^2$ group in the second compound B) b)) is an aliphatic group containing from 9 to 36 carbon atoms, and said second compound B) b) is present in from about 0.001 to about 50 mole %, based on the moles of the first compound B)a), and when component C) is present $R^2$ in formula II contains from 4 to 36 carbon atoms.

2. The branched compound of claim 1 wherein said ratio is from about 0.8:1 to about 1.4:1.

3. The branched compound of claim 1 wherein component C is present and contains alkyleneoxy groups.

4. The branched compound of claim 3 wherein the alkyleneoxy groups are ethyleneoxy groups or mixtures of ethyleneoxy and 1,2-propyleneoxy groups.

5. The branched compound of claim 1 wherein component A) is epichlorohydrin.

6. The branched compound of claim 1 wherein component A) is a trihaloalkane.

7. The branched compound of claim 1 wherein in component B) the $R^2$ group is a straight or branched chain alkyl group.

8. The branched compound of claim 7 wherein in component B) n is a number from 2 to 20.

9. The branched compound of claim 1 wherein component C)a) is present and has the formula $$R^3((OA)_xOH)_y \qquad (IV)$$

wherein $R^3$ is a straight or branched chain $C_3$–$C_{36}$ alkyl group, each OA group is independently an ethyleneoxy, 1,2-propyleneoxy, or 1,2-butyleneoxy group, each x in each y group is independently a number of from 0 to 200, and y is a number of at least 3.

10. The branched compound of claim 9 wherein at least one x is a number of from 1 to 200.

11. The branched compound of claim 9 wherein the OA groups are all ethyleneoxy groups.

12. The branched compound of claim 9 which is a glycerin alkoxylate, a trimethylol propane aloxylate, a pentaerythritol alkoxylate, or a polyvinyl alcohol.

13. The branched compound of claim 1 wherein component C)b) is present and is a compound of the formula $$H_2N(AO)_nA\,NH_2 \qquad (V)$$

in which each A group is independently an ethylene or 1,2-propylene group, and n is a number of from 0 to 200.

14. The branched compound of claim 13 wherein n is a number of from 2 to 20.

15. The branched compound of claim 1 wherein component C) b) is present and is a polyamine of the formula

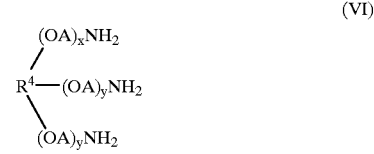

(VI)

(VI)

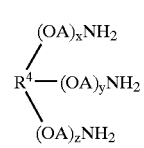

in which $R^4$ is a straight or branched chain $C_3$–$C_{35}$ alkyl group, each OA group is independently an ethyleneoxy or 1,2-propyleneoxy group, and x, y and z are each independently a number of from 1 to 200.

16. The branched compound of claim 1 wherein in component B), X is —OH.

17. The branched compound of claim 1 wherein in component B), X is —NH_2.

18. The reaction product of claim 1 wherein the mole ratio of component A) to the sum of components B) plus C) is from about 0.8:1 to about 2:1.

19. A mixture of branched compounds of claim 1 comprising a mixture of the following components:
   I) from about 1 to about 99 mole % of at least one reaction product of
      a) at least one compound of formula II a), and
      b) a compound of formula I; and
   II) from about 99 to about 1 mole % of at least one reaction product of
      c) at least one compound of formula II)b); and
      d) a compound of formula I.

20. The mixture of claim 19 wherein the mole ratio of component b) to component a) and the mole ratio of component d) to component c) is from about 0.8:1 to about 2:1.

21. The mixture of claim 19 wherein at least one of component b) and component d) is an epihalohydrin.

22. The mixture of claim 21 wherein the epihalohydrin is epichlorohydrin.

23. The mixture of claim 19 wherein all OA groups are ethyleneoxy groups.

24. The mixture of claim 19 wherein the $R^2$ groups are both alkyl groups.

25. The mixture of claim 19 wherein from about 10 to about 90 mole % of component I) and from about 90 to about 10 mole % of component II) are present in the mixture.

26. The mixture of claim 25 wherein from about 20 to about 80 mole % of component I) and from about 80 to about 20 mole % of component II are present.

27. The branched reaction product of claim 1 in which component c) is present and is a $C_3$–$C_{35}$ polyfunctional hydroxy compound or a $C_2$–$C_{36}$ polyfunctional amine compound.

28. The branched reaction product of claim 27 wherein the polyfunctional compound is present in from about 0.001 to about 50 mole %, based on the moles of component A).

29. An organic solvent solution containing from about 15 to about 40% by weight of at least one branched compound of claim 1.

30. A hydrophilic emulsion polymer latex composition containing from about 0.1 to about 20% by weight of a branched compound of claim 1, based on the solids content of the composition.

31. A method for defoaming and/or stabilizing an aqueous or aqueous/organic solvent composition comprising adding to said composition a defoaming-effective and/or stabilizing-effective quantity of a branched compound of claim 1.

32. The method of claim 31 wherein the aqueous composition is a hydrophilic emulsion polymer latex composition.

33. The branched compound of claim 1 wherein component C) is present in from about 10 to about 30 mole %.

34. The method of claim 31 wherein the method includes defoaming of microfoam.

35. A method of controlling microfoam in a water-based coating composition comprising adding to a finished water-based coating composition or adding thereto during its preparation a microfoam inhibiting quantity of at least one water-soluble or water-dispersible reaction product comprising the reaction between A) a linking compound of formula I $$R^1(X)_3 \quad \text{(II)}$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and B) at least one compound having the formula VII $$R^5(EO)_n(PO)_m(BO)_p X \quad \text{(VII)}$$

wherein $R^5$ is a substituted or unsubstituted, saturated or unsaturated oxy or thio hydrocarbon group having from 1 to 22 carbon atoms or a secondary amino group having from 2 to 22 carbon atoms; EO represents ethyleneoxy; PO represents propyleneoxy; BO represents butyleneoxy; n is a number of from 0 to 50; m is a number of from 0 to 50; p is a number of from 0 to 50; and X is hydrogen, or X can be a mercapto group or an amino group in place of a terminal —OH group, provided that when X is mercapto or amino, the sum of n, m, and p is at least 1.

36. A process for the preparation of a reaction product of claim 1 comprising the steps of I) heating at least one compound of the formula II $$R^2(OA)_n X \quad \text{(II)}$$

wherein $R^2$ is an organic group containing from 4 to 36 carbon atoms, n is a number of from 0 to 200, X is —OH, —SH, or —NHR' wherein R' is hydrogen or a $C_1$–$C_4$ alkyl group, and each OA group is independently an ethyleneoxy, 1,2-propyleneoxy, or 1,2-butyleneoxy group, to a temperature in the range of from about 800 to about 1 80° C. under vacuum in an inert atmosphere;

II) adding thereto an aqueous alkali metal hydroxide while removing water from the resulting mixture;

III) when the water level of the mixture is less than about 2%, adding thereto at least one compound of formula I $$R^1(X)_3 \quad \text{(I)}$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms, and continuing the reaction until the reaction is substantially complete; and IV) separating the reaction product from the salt formed in the reaction;

wherein the above reaction is carried out in the absence of any organic solvent.

37. The process of claim 36 wherein the mole ratio of the least one compound of formula I to the at least one compound of formula II is from about 1.05:1 to about 5:1.

38. The process of claim 36 wherein the at least one compound of formula I is epichlorohydrin.

39. The method of claim 35 wherein at least one other defoaming agent is also added to said water-based coating composition.

40. A branched reaction product of the reactants comprising

A) at least one compound of formula I $$R^1(X)_3 \quad \text{(I)}$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and B) at least one compound having the formula VII $$R^5(EO)_n(PO)_m(BO)_p X \quad \text{(VII)}$$

wherein $R^5$ is a substituted or unsubstituted, saturated or unsaturated oxy or thio hydrocarbon group having from 1 to 22 carbon atoms or a secondary amino group having from 2 to 22 carbon atoms; EO represents ethyleneoxy; PO represents propyleneoxy; BO represents butyleneoxy; n is a number of from 0 to 50; m is a number of from 0 to 50; p is a number of from 0 to 50; and X is hydrogen, or X is a mercapto group or an amino group in place of a terminal —OH group; provided that the sum of n, m, and p is at least 2; and further provided that when the $R^5$ group is an oxy hydrocarbon group X is other than hydrogen.

* * * * *